UNITED STATES PATENT OFFICE.

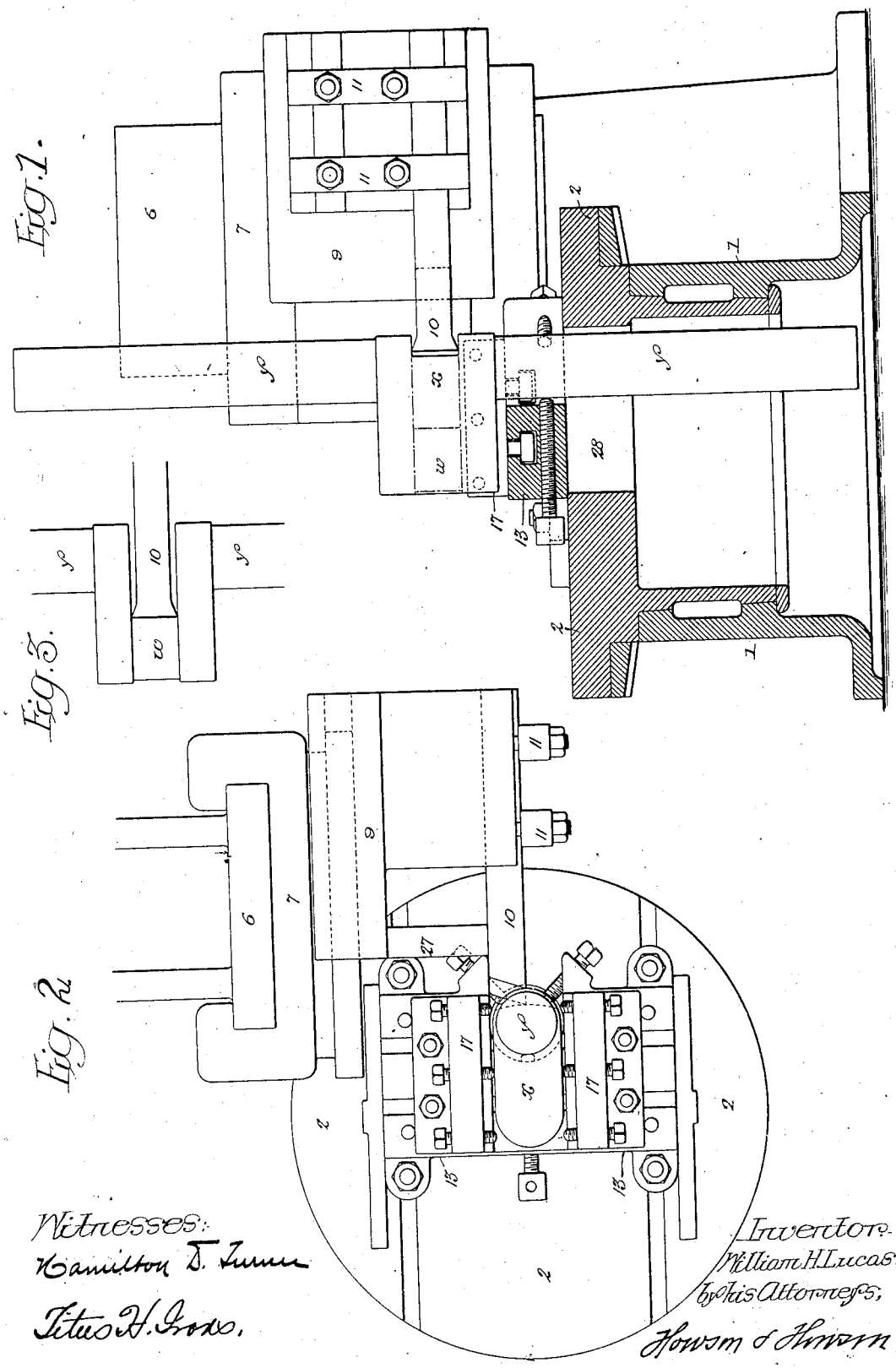

WILLIAM H. LUCAS, OF PHILADELPHIA, PENNSYLVANIA, ASSIGNOR TO HIMSELF, FREDERICK F. ESPEN, AND JACOB ESPEN, JR., OF PHILADELPHIA, PENNSYLVANIA, TRADING AS ESPEN-LUCAS MACHINE WORKS, A FIRM.

TURNING CRANK-PINS.

No. 833,612.     Specification of Letters Patent.     Patented Oct. 16, 1906.

Application filed November 18, 1905. Serial No. 288,054.

*To all whom it may concern:*

Be it known that I, WILLIAM H. LUCAS, a citizen of the United States, residing in Philadelphia, Pennsylvania, have invented certain Improvements in Turning Crank-Pins, of which the following is a specification.

The object of my invention is to effect the turning of crank-pins with less expenditure of time and labor and with better results than attend the turning of such crank-pins in the usual manner. This object I attain in the manner hereinafter set forth, reference being had to the accompanying drawings, in which—

Figure 1 is a view, partly in side elevation and partly in section, illustrating a crank-shaft having a crank-block thereon and mounted in a lathe in order that the crank-pin can be turned from said crank-block in accordance with my invention, this view showing the beginning of the cut in the block. Fig. 2 is a plan view of the same; and Fig. 3 is a view showing the relation of the crank-shaft, crank-block, and cutting-tool on the completion of the operation.

The ordinary method of turning the crank-pins of crank-shafts is to first rough out the crank either by forging the same or by roughly cutting it from a solid crank-block, the shaft with the roughly-formed crank thereon being then mounted in a horizontal lathe, so that one of the crank-arms can be connected to a rotating face-plate when the crank is adjusted, so that the axis of the crank-pin is concentric with the axis of rotation of the face-plate, the opposite ends of the shaft being carried by rotating centers, mounted upon the head and tail stocks of the lathe. In a lathe of this character gravity assists the rotating movement throughout a portion of the same and retards it during the remaining portion, owing to the fact that the shafts and the greater portion of the crank are disposed eccentrically to the axis of rotation of the face-plate. Hence it is necessary to counterbalance said face-plate in order to overcome this defect. If, however, an attempt is made to turn up the crank-pin from a solid crank-block in a lathe of this character, the face-plate cannot be effectively counterbalanced, for the weight to be compensated for decreases with each cut of the tool.

In carrying out my invention, therefore, I practically eliminate the effect of gravity upon the rotation of the crank-shaft by disposing the latter vertically and arranging the other parts of the lathe and the cutting-tool with reference to effecting the turning of the crank-pin while the crank-shaft structure is rotated about a vertical axis concentric with said pin. Such a lathe is shown in Fig. 1 of the drawings, 1 representing a suitable bed provided with bearings for a rotatable horizontal bed-plate 2, which may be rotated by any suitable means. Rising from the bed 1 of the machine is a standard 6, and upon the same is vertically guided a slide 7, provided with a horizontally-movable tool-carriage 9, the turning-tool 10 being securely confined to the face of said carriage by means of any desired number of clamping-bars 11, provided with appropriate securing bolts and nuts. The rotary bed-plate 2 has mounted thereupon, so as to be adjustable across the same, a block 13, and mounted upon the latter so as to be adjustable thereon in a direction at right angles to the direction of its own movement are suitable clamping-jaws 17, each of which has a series of clamping-screws whose inner ends bear upon the opposite sides of the crank-block $x$, formed upon the crank-shaft $y$, as shown in Figs. 1 and 2. The bed-plate 2 has therein a slot 28 for the reception of the depending member of the crank-shaft when the crank-block has been adjusted upon the bed-plate so that the axis of rotation of the latter is concentric with the axis of the desired crank-pin to be turned from said block, as shown in Fig. 1, and the tool-carriage is so adjusted that the projecting tool begins to cut upon that portion of the crank-block adjacent to the shaft $y$, as shown in Figs. 1 and 2, movement of the tool-carriage gradually deepening the cut until the formation of the crank-pin $w$ has been completed, as shown in Fig. 3.

In order to better enable the cutting-tool to resist the strain upon it, a supporting-strut 27 is interposed between the projecting portion of the tool and the carriage 9, as shown in Fig. 2. In small cranks a single cut by a tool as wide as the space between the cheeks of the crank will suffice to properly form the pin, as shown in the drawings;

but in larger cranks two or more cuts side by side may be needed; but in any case the preliminary forging, cutting, or other rough shaping of the crank preparatory to the formation of the crank-pin is unnecessary.

I do not herein claim the construction of lathe which I have shown and described, as this forms the subject of my Patent No. 808,057 dated December 19, 1905.

I claim—

The herein-described method of forming crank-pins, which consists in first forming a blank having a laterally-projecting solid crank-block on one side, then turning away the excess of metal while rotating said blank around a vertical axis concentric with the desired crank-pin, substantially as specified.

In testimony whereof I have signed my name to this specification in the presence of two subscribing witnesses.

WM. H. LUCAS.

Witnesses:
WALTER CHISM,
JOS. H. KLEIN.